(12) United States Patent
Babala et al.

(10) Patent No.: US 7,707,867 B2
(45) Date of Patent: May 4, 2010

(54) METHOD FOR CORRECTION OF INERTIAL SENSOR MOUNTING OFFSETS

(75) Inventors: Mike Babala, Plymouth, MI (US); Kevin Fontenot, Ypsilanati, MI (US)

(73) Assignee: Kelsey-Hayes Company, Livonia, MI (US)

(*) Notice: Subject to any disclaimer, the term of this patent is extended or adjusted under 35 U.S.C. 154(b) by 283 days.

(21) Appl. No.: 11/712,321

(22) Filed: Feb. 28, 2007

(65) Prior Publication Data

US 2007/0150221 A1  Jun. 28, 2007

Related U.S. Application Data

(63) Continuation-in-part of application No. PCT/US2005/031292, filed on Aug. 31, 2005.

(60) Provisional application No. 60/605,735, filed on Aug. 31, 2004.

(51) Int. Cl.
*G01P 21/00* (2006.01)
(52) U.S. Cl. ....................................... 73/1.38
(58) Field of Classification Search .......... 73/1.37–1.38
See application file for complete search history.

(56) References Cited

U.S. PATENT DOCUMENTS

| 2,882,717 | A * | 4/1959 | Brown ........................ 73/1.38 |
| 6,055,841 | A * | 5/2000 | Yamada et al. ............... 73/1.38 |
| 6,421,622 | B1 | 7/2002 | Horton et al. |
| 6,792,792 | B2 * | 9/2004 | Babala ........................ 73/1.38 |
| 7,373,227 | B2 * | 5/2008 | Lu et al. ........................ 701/29 |
| 2002/0100310 | A1 | 8/2002 | Begin |
| 2003/0061859 | A1 | 4/2003 | Rothoff |
| 2003/0084704 | A1 | 5/2003 | Hanse |
| 2003/0236604 | A1 | 12/2003 | Lu et al. |
| 2004/0163470 | A1* | 8/2004 | Babala et al. ............. 73/514.01 |
| 2004/0173716 | A1* | 9/2004 | Gegalski et al. ............. 248/200 |

* cited by examiner

*Primary Examiner*—Hezron Williams
*Assistant Examiner*—Nashmiya S Fayyaz
(74) *Attorney, Agent, or Firm*—MacMillan, Sobanski & Todd, LLC

(57) ABSTRACT

A method for calibration of motion sensors included in a vehicle electronic brake control system includes measuring sensor offset errors at different points in the assembly of the system and the vehicle and then combining the offset errors to obtain net offset errors for use with an electronic brake system.

16 Claims, 7 Drawing Sheets

METHOD FOR CORRECTION OF INERTIAL SENSOR MOUNTING OFFSETS

CROSS-REFERENCE TO RELATED APPLICATIONS

This application is a continuation-in-part of International Application No. PCT/US2005/031292, filed Aug. 31, 2005, which claims priority from Provisional Patent Application No. 60/605,735, filed Aug. 31, 2004. The disclosures of both applications are incorporated herein by reference.

BACKGROUND OF THE INVENTION

This invention relates in general to vehicle stability control systems and in particular to a method to compensate for mounting errors of the inertial sensors used in vehicle stability control systems.

Performing vehicle stability control (VSC) with an electronic control unit (ECU) requires accurate inputs of the vehicle's inertial state. This is accomplished with a sensor for detecting and measuring vehicle rotation about a vertical axis, that is, a yaw rate sensor, and either a single lateral accelerometer or a lateral accelerometer and a longitudinal accelerometer. Regardless of how many accelerometers are utilized, it is necessary that all of the internal state sensors are accurately mounted in the vehicle. Ideally, the rotational velocity sensors and accelerometers are mounted with their principle sensing axis aligned with the vehicle's three spatial axes. The three vehicle spatial axes for a vehicle 10 are illustrated in FIG. 1 where the arrow labeled 12 corresponds to the vehicle longitudinal axis that runs along the length of the vehicle and points toward the forward direction of movement for the vehicle. A second spatial axis labeled 14 corresponds to the vehicle lateral axis and is perpendicular to the longitudinal axis 12. A third spatial axis labeled 16 that extends perpendicular to the plane formed by the longitudinal and lateral axes 12 and 14 corresponds to a vertical axis of the vehicle. Thus, an accelerometer for measuring acceleration and velocity of the vehicle would be ideally mounted with its sensing axis parallel to the vehicle longitudinal axis 12 while an accelerometer for measuring lateral motion of the vehicle would be mounted with its sensing axis parallel to vehicle lateral axis 14.

Three spatial rotational velocities are also illustrated in FIG. 1 where the circular arrow labeled 18 that is centered upon the longitudinal axis 12 corresponds to vehicle roll velocity while the circular arrow labeled 20 that is centered upon lateral axis 14 corresponds to vehicle pitch velocity. Similarly, the circular arrow labeled 22 that is centered upon the vertical axis 16 corresponds to yaw velocity. Each of these rotational velocities may be measured by a rotational velocity sensor that would ideally have its axis of rotation parallel to the vehicle spatial axis about which the rotational velocity occurs. Thus, for a measurement of yaw velocity, the corresponding yaw velocity sensor would have its axis aligned with the vehicle vertical spatial axis 16.

If the yaw rate sensor and accelerometers are not accurately mounted, erroneous information will be transferred to the ECU. Signal error due to mounting, which is the difference between the actual inertial state and the sensor's measured state, is a function of $\cos \ominus$, where $\ominus$ is the angle between the axis of measurement and the actual sensor mounting. For example, a sensor 24 that is intended to measure yaw rate is illustrated in FIG. 2 where the spatial axes of the vehicle are shown by the solid arrows labeled 12, 14 and 15. In FIG. 2, the vertical axis of the sensor 24 is aligned with the vehicle vertical axis 16; however, the lateral axis of the sensor 24, that is illustrated by the dashed arrow labeled 26 is offset by the angle $\ominus$ from the vehicle pitch axis 14. For small $\ominus$, this error is not significant; however, cross-axis error, which is sensitivity to inertia in an axis not intended to be measured, is a function of $\sin \ominus$. For small $\ominus$, the cross-axis error is significant. For example, consider that the sensor 24 shown in FIG. 2 has a 5° mounting error relative to the pitch axis 14. During an actual 50°/sec yaw maneuver, the sensor would have an output of (cos 5°)*50°/sec, or 49.8°/sec. However, during 100°/sec pitch maneuver, which has a zero °/sec yaw, the yaw sensor would have an output of (sin 5°)*100°/sec, or 8.7°/sec instead of zero °/sec. This signal is incremental to any existing errors. Similar errors also would occur for accelerometer measurements.

To prevent unintended interventions by the VSC ECU in response to the errors described above, activation thresholds for the VSC are increased. However, increasing the thresholds may reduce the sensitivity of the ECU. Accordingly, it would be desirable to minimize the effect of such errors.

BRIEF SUMMARY OF THE INVENTION

This invention relates to a method to compensate for mounting errors of the inertial sensors used in vehicle stability control systems.

Regarding cross-axis errors, the root cause of such errors is the mounting of the sensors. It is desirable to mount the sensors perfectly in the intended axis of measurement or to quantify the actual mounting error. However, perfect mounting is not feasible; therefore, the best solution is to quantify the actual mounting errors and store them in a non-volatile memory for use by the VSC control algorithm. An approach for doing this in a VSC system uses multiple accelerometers that measure true lateral and longitudinal acceleration at the time of manufacture. Allowable offset errors due to the manufacturing of lateral and longitudinal accelerometers and an Electronic Control Unit (ECU) in which the accelerometers are mounted are measured with the ECU accelerometers and stored in a non-volatile memory location before being mounted in a vehicle. When the ECU and sensors are mounted in the vehicle, these offsets are communicated to a microprocessor, which contains algorithms for performing VSC. The microprocessor then measures offset errors after installation of the sensors upon the vehicle, and combines the errors with the errors stored in memory from the manufacturing of the sensors and ECU. With this information, and input from other vehicle sensors, the errors due to installation for the sensors on a vehicle can be compensated.

More specifically, the invention contemplates a method for reducing cross-axis mounting error for an inertial sensor that includes installing the sensor within an electronic control unit that is attached to a hydraulic valve body that is carried by a mounting bracket. The entire assembly is placed upon a test stand and rotated with the sensor actuated to determine any assembly errors due to miss-mounting of sensor within the electronic control unit and/or assembly tolerances. The resulting assembly errors are stored in a non-volatile memory. The assembly is then installed upon a vehicle and the vehicle is placed upon a true surface and the mounting off-set errors are measured. Corrected offset errors are then determined by combining the mounting offset errors with the stored assembly errors. The corrected offset errors are then stored in the non-volatile memory for use with an electronic brake control system.

The invention further contemplates that prior to installing the sensor within the electronic control unit, the sensor is placed upon a true surface and any offset errors for the inertial sensor relative to the true surface are measured. The offset errors are then stored in the non-volatile memory. The offset errors are later combined with the assembly and mounting offset errors for use with an electronic brake control system.

The invention further contemplates that prior to mounting upon a vehicle, the sensor is installed within an electronic control unit that is attached to a hydraulic valve body that is carried by a mounting bracket. The entire assembly is placed upon a test stand and rotated with the sensor actuated to determine any assembly errors due to miss-mounting of sensor within the electronic control unit and/or assembly tolerances. The assembly errors are then combined with the stored offset errors and stored for later combination with the corrected offset errors measured after installation upon the vehicle.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
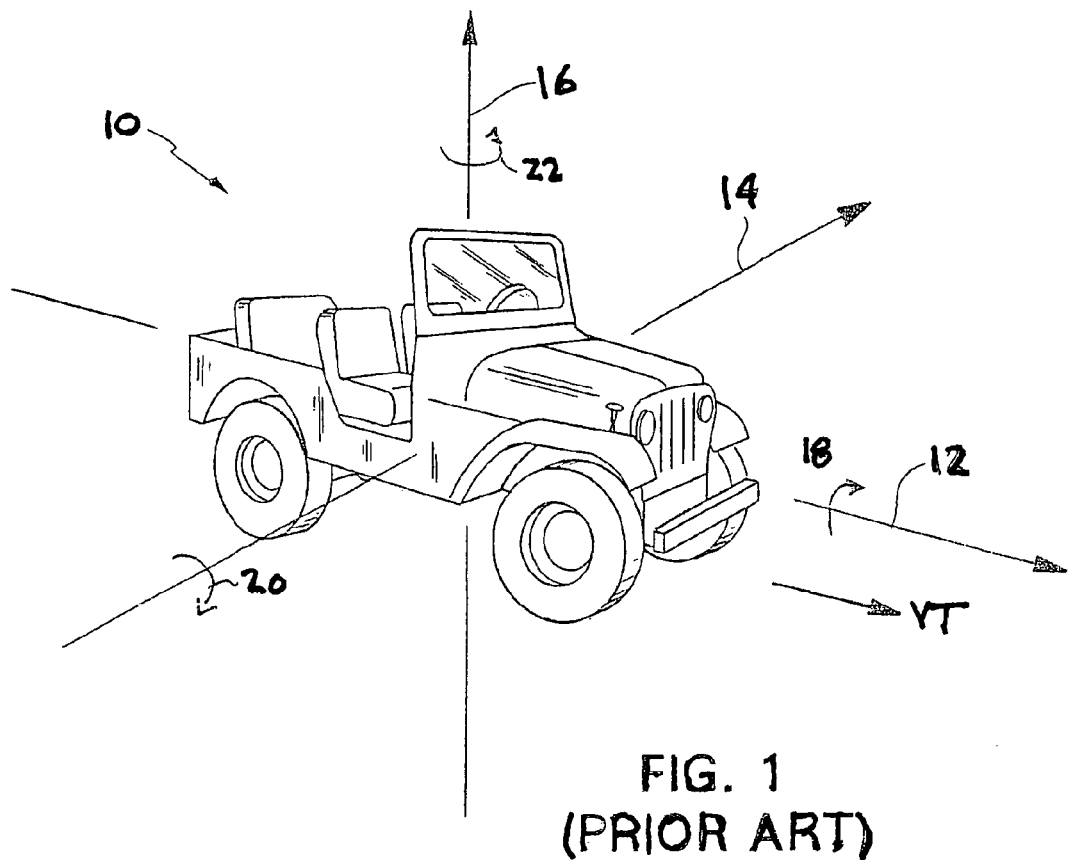
FIG. 1 illustrates a directional control axis system for a vehicle.
Figure 2:
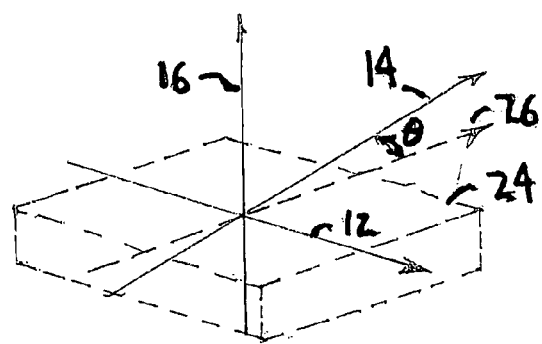
FIG. 2 illustrates potential misalignment error for a motion sensor mounted upon the vehicle shown in FIG. 1.
Figure 3:
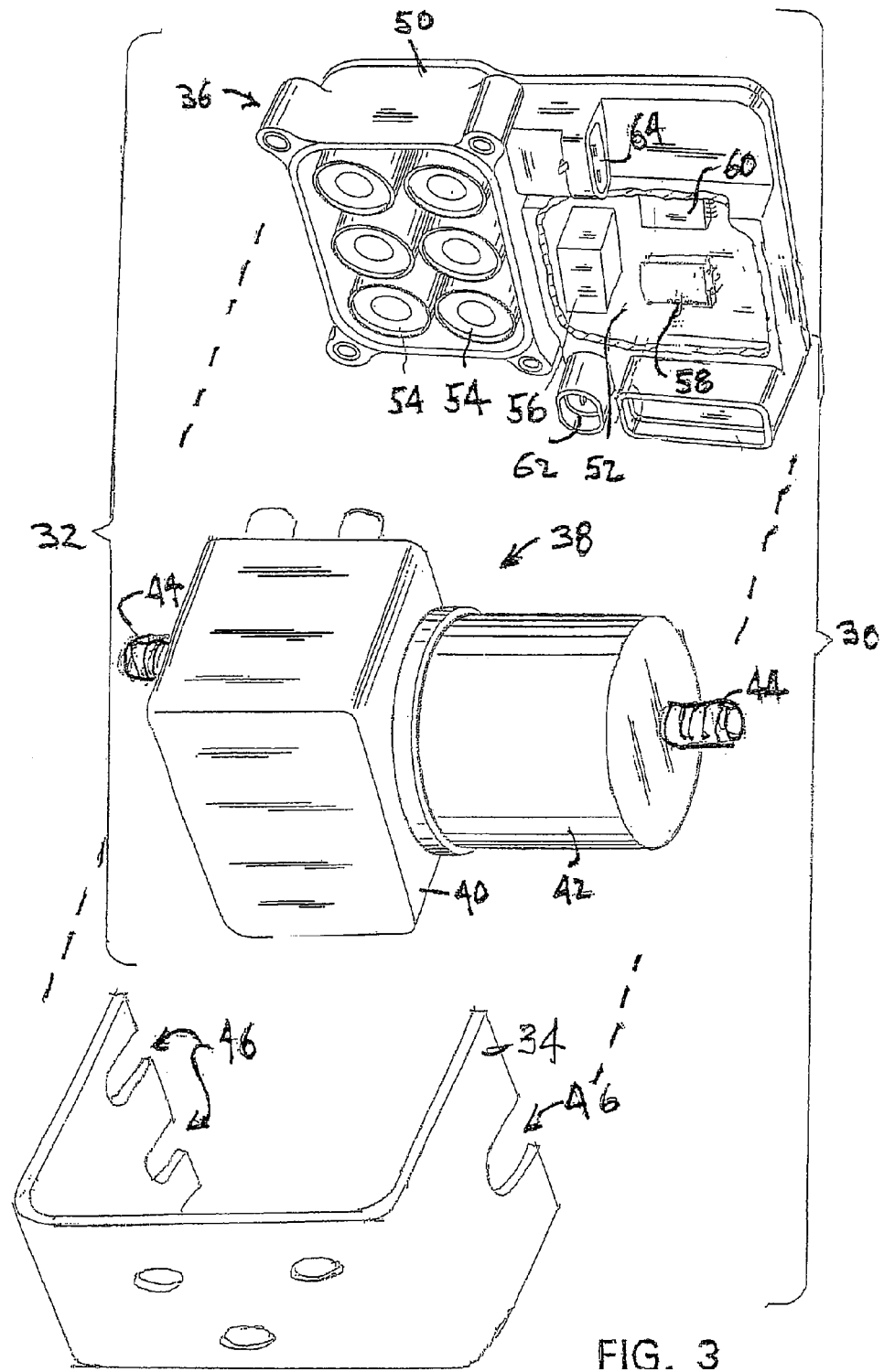
FIG. 3 is an exploded perspective view of a hydraulic control unit and mounting bracket for installation in the vehicle shown in FIG. 1.

Referring now to the drawings, there is illustrated in FIG. 3 an exploded perspective view of a Vehicle Stability Control (VSC) System Control Unit assembly 30. The control unit assembly 30 includes hydraulic control unit 32 and a mounting bracket 34 for securing the assembly 30 upon a vehicle, such as the vehicle 10 shown in FIG. 1. The hydraulic control unit 32 is comprised of an electronic control unit 36 that is removably mounted upon a hydraulic valve unit 38.

The hydraulic valve unit 38 includes a hydraulic valve body 40 upon which is mounted an electric pump motor 42. The motor 42 drives a hydraulic pump (not shown) disposed within the valve body 40. The pump provides pressurized hydraulic fluid to a plurality of solenoid valves (not shown) that are also disposed within the valve body 40. A plurality of ports (not shown) formed in the valve body provide a connection between the solenoid valves and components of the vehicle hydraulic brake system. In the preferred embodiment, the hydraulic valve unit 36 also carries a plurality of threaded studs 44 (two shown) that are received by corresponding slots 46 formed in the mounting bracket 34. The studs 44 are secured in the bracket slots 46 by nuts (not shown) to retain the control unit 30 within the mounting bracket 34. Alternately, a plurality of threaded apertures may be formed in the valve body 40 and/or motor housing that receive threaded fasteners to secure the control unit 30 within the bracket 34. When threaded fasteners are utilized, the slots 46 in the mounting bracket 34 may be replaced by apertures (not shown).

The electronic control unit 36 includes a housing 50 that carries a printed circuit board 52 or circuit substrate. A plurality of solenoid coils 54 are also carried by the circuit board 52 with one coil 54 corresponding to each of the solenoid valves disposed within the hydraulic valve body 40. The solenoid coils 54 are selectively actuated by electronic components that are mounted upon the circuit board 52. Among the components is a microprocessor 56 with a Non-Volatile Random Access Memory (NVRAM). A control algorithm for the VSC System is stored within the NVRAM. Alternately, a Application Specific Integrated Circuit (ASIC) may be utilized in place of the microprocessor 56. Also mounted directly upon the circuit board 52 is at least one accelerometer 58 and a yaw velocity sensor 60. The accelerometer 58 would be oriented with its principle axis aligned for measurement of vehicle lateral motion while the yaw velocity sensor 60 would be oriented with its principle axis aligned for measurement of vehicle yaw motion. Additionally, the invention contemplates that a second accelerometer (not shown) also may be mounted upon the circuit board 52 with its principle axis aligned to measure longitudinal motion. Alternately, a single two-axis accelerometer or a combination of single and/or multi-axis accelerometers may be utilized. In the preferred embodiment, two accelerometers, measuring longitudinal and lateral acceleration, and one angular velocity sensor, measuring yaw rate, are used.

While the accelerometer 58 and rotational velocity sensor 60 are illustrated in FIG. 3 as being mounted directly upon the printed circuit board, the invention also contemplates that other mounting methods may be utilized. For example, the accelerometer 58 and rotational rate sensor 60 also may be mounted upon a secondary daughter board or another structure to allow orientation of the accelerometer and rotational rate sensor principle sensing axes with the vehicle spatial axes 12, 14 and 16. Additionally, the mounting structure may be movable relative to the circuit board 52 to permit alignment of the sensor principle sensing axes with the vehicle spatial axes. The electronic control unit 36 also includes a first electrical connector 62 for supplying power to the pump motor 42 and a second electrical connector 64 for connecting to the other electrical components such as the vehicle power supply (not shown) and wheel speed sensors (not shown).

During operation, the microprocessor 56 in the electronic control unit 36 receive signals from components mounted upon the vehicle 10, such as, for example, wheel speed sensors. The received signals are combined with signals generated by the accelerometer 58 and/or rotational velocity sensor 60 to determine if a correction of the vehicle direction is needed. If a correction is needed, the microprocessor 56 actuated the pump motor 42 and selectively actuates the solenoid valves to apply vehicle brakes to correct the vehicle direction. Additionally, the microprocessor 56 also may send signals to the vehicle engine computer to change the vehicle speed.

As described above, the inertial sensors, to include the accelerometers and the yaw rate sensors 58 and 60, are mounted within the electronic control unit 36, either directly upon the printed circuit board 52 or another mounting structure. The electronic control unit 36 is, in turn, mounted upon the hydraulic valve unit 38, which is then mounted upon the bracket 34. The entire control unit assembly 30 is then mounted upon the vehicle 10. Each of these mounting operations introduces tolerance errors that combine to produce a total stack up tolerance error. Regarding cross-axis errors, the root cause of such errors is misalignment of the sensors relative to the vehicle spatial axes 12, 14 and 16 as a result of the mounting of the sensors. It is desirable to mount the sensors perfectly in the intended axis of measurement or to quantify the actual mounting error. Perfect mounting is not feasible; therefore, the present invention contemplates a method for quantifying the actual mounting errors and storing the mounting errors within the NVRAM for use by the VSC control algorithm. In the preferred embodiment, for a VSC system, two accelerometers that measure lateral and longitudinal acceleration are utilized.

Figure 4:
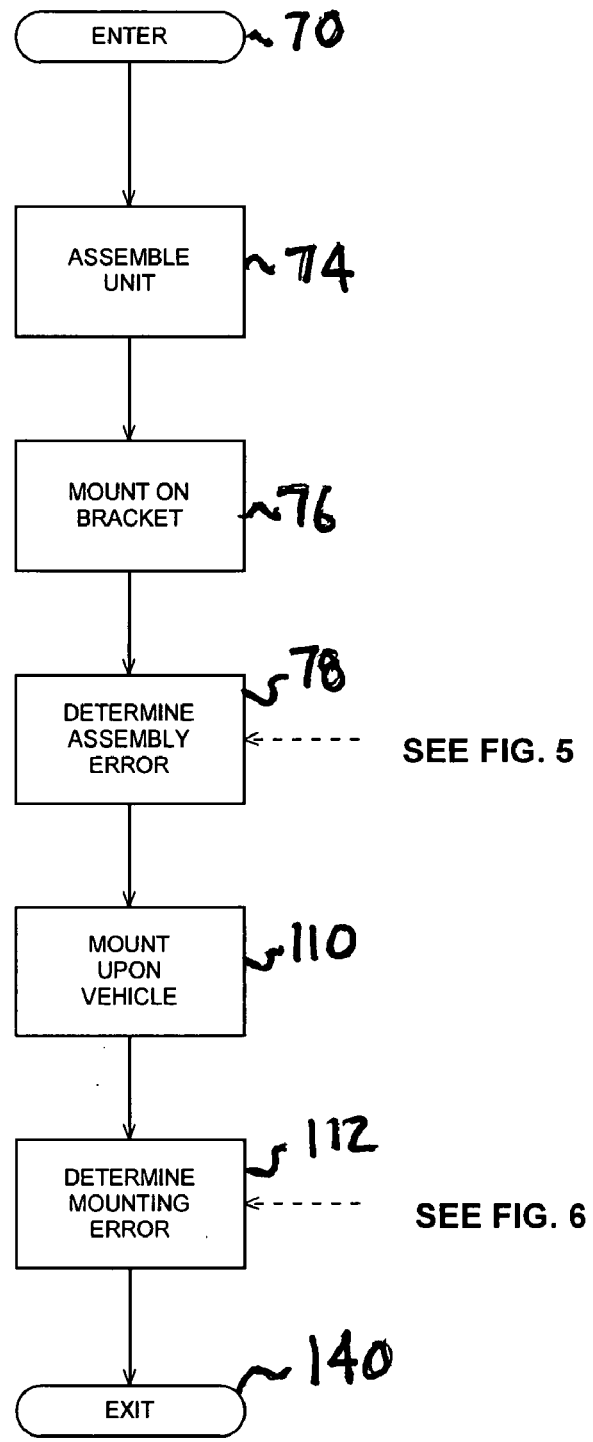
FIG. 4 is flow chart for a method for correcting sensor mounting offset errors in accordance with the present invention.
Figure 5:
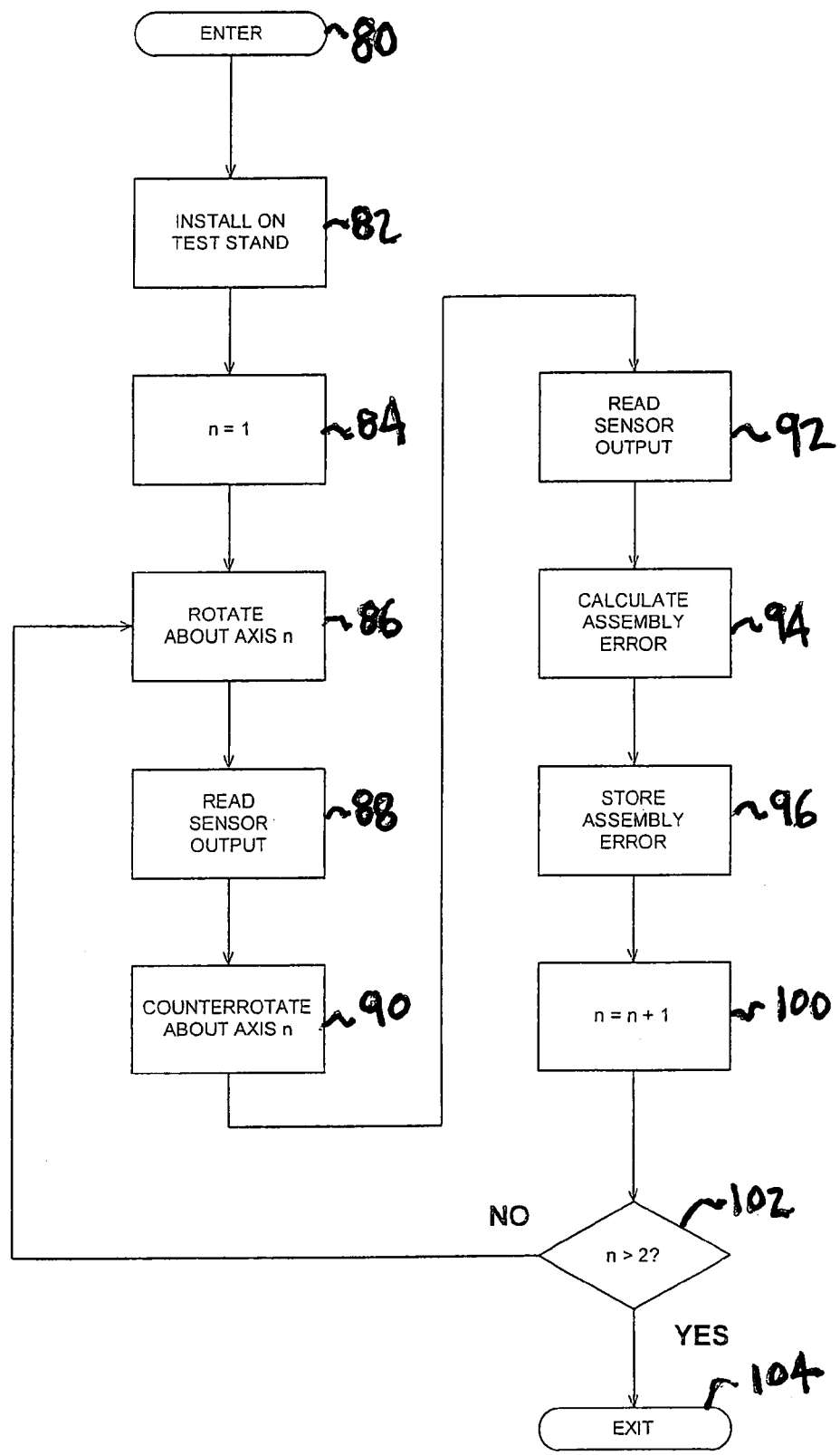
FIG. 5 is a flow chart for calibration of a hydraulic control unit and mounting bracket that is represented by one of the blocks shown in FIG. 4.
Figure 6:
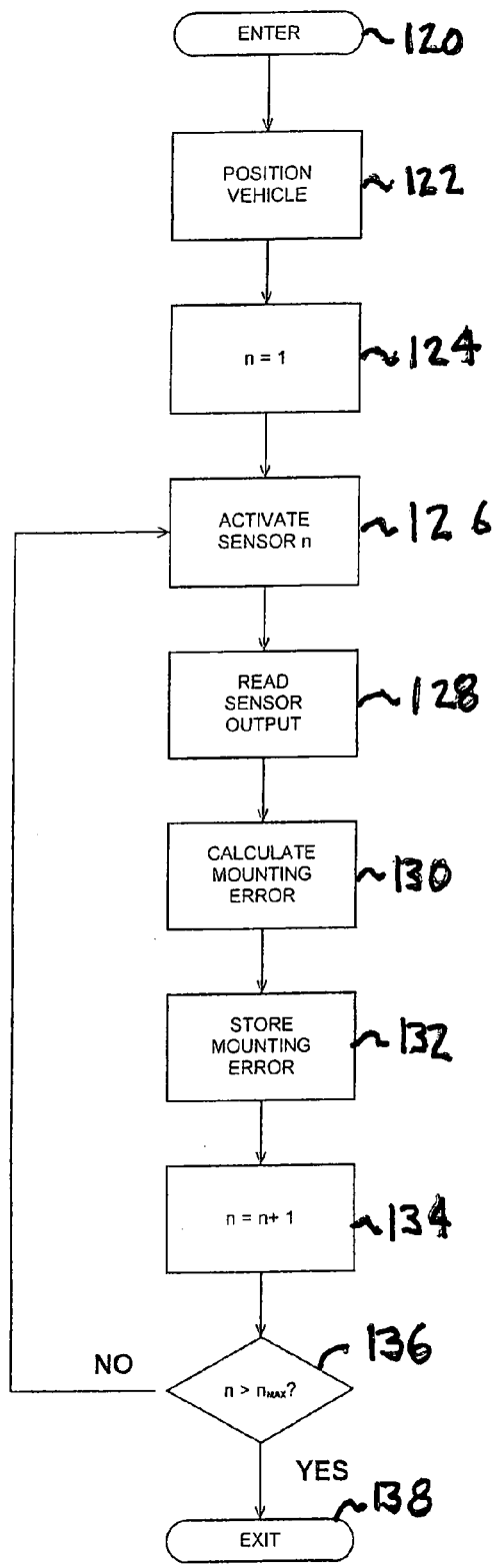
FIG. 6 is a flow chart for further calibration of the hydraulic control unit and mounting bracket that is represented by of the blocks shown in FIG. 4.

The method of the present invention is illustrated by the flow charts shown in FIGS. 4 through 5. The overall method is illustrated in FIG. 4, while FIGS. 5 and 6 provide expansion of blocks that are included in FIG. 4. The method is entered through the block labeled 70 and proceeds to functional block 74 where the hydraulic control unit 32 is fabricated. As described above, the sensors are either mounted directly upon the printed circuit board 52 or upon a supporting structure that is mounted upon the printed circuit board 52. The printed circuit board 52 is disposed within the electronic control unit housing 50 to form the electronic control unit 36 and the electronic control unit 36 is then attached to the hydraulic valve body 38 to form the hydraulic control unit 32. The method then continues to functional block 76 where the hydraulic control unit 32 is secured to the mounting bracket 34 to form the control unit assembly 30. The method then advances to functional block 78.

In functional block 78, assembly errors for the control unit assembly 30 are determined as illustrated by the flow chart shown in FIG. 5. The flow chart in FIG. 5 is entered through block 80 and proceeds to functional block 82 where the control unit assembly 30 is mounted upon a gimbaled test stand that may be rotated about each of three orthogonal axes that corresponds to the vehicle's spatial axes 12, 14 and 16. The method then advances to functional block 84 where an index representing one of the non-sensing orthogonal axes is set to one and the inertial sensor to be tested is energized. The method then continues to functional block 86 where the assembly 30 is rotated about the selected axis to a position that is perpendicular to the sensing axis. The method advances to functional block 88 where the sensor output is measured and stored within the test equipment as a first assembly offset. The assembly is then counter rotated by 180 degrees about the selected axis in functional block 90 and the sensor output is again measured and stored within the test equipment as a second assembly offset in functional block 92. The method then advances to functional block 94 where a correction factor is calculated for the sensor by taking half of the difference between the first and second assembly offsets measured in functional blocks 88 and 92. The calculated correction factor is then stored in the NVRAM of the electronic control unit 36 in functional block 96 for the axis of rotation.

As an example to the above described process, the application to a longitudinal sensor will be described. The assembly 30 is mounted the gimbaled test stand with same spatial orientation as it is expected to have when mounted upon the vehicle 10. The gimbaled test stand is then rotated about the horizontal axis corresponding to the lateral axis by ninety degrees so that the longitudinal sensing axis is aligned with the upward directed vertical axis that is perpendicular to the longitudinal axis by rotating the assembly by 90 degrees. The output is read and then the sensor is counter rotated by 180 degrees about the lateral axis so that the longitudinal sensing axis is aligned with the downward directed vertical axis and the output is again read. The two measured outputs are then combined to determine a single net lateral axis offset error. In the preferred embodiment, the calculation involves adding the outputs and then dividing the sum by two.

The method then advances to functional block 100 where the axis index is increased by one. The method continues to decision block 102 where the current axis index is compared to two, which represents the number of orthogonal axes for testing. If, in decision block 102, the current index is less than or equal to two, the method transfers to functional block 86 and proceeds to determine another calculated correction factor for the current axis. Thus, for the longitudinal sensor example described above, the sensor is rotated about the remaining non-sensing axis, which is the vertical axis, and a vertical axis offset error is determined. If, in decision block 102, the current index is greater than two, the method is done and exits back to FIG. 4 through block 104. The resulting offsets that are measured are caused by assembly tolerances that introduce an error between the actual longitudinal axis of the sensor and the desired vehicle longitudinal axis. The present invention contemplates that the above described calibration is then repeated for each accelerometer that is mounted within the electronic control unit 36 before continuing to functional block 110 in FIG. 4.

Following the determination of the assembly error for the control unit assembly 30 in functional block 78, the assembly would be shipped to the vehicle manufacturer where it is installed upon a vehicle, as shown in functional block 110. While the mounting bracket 34 is designed for the specific vehicle and provides for aligning the sensor axes with the vehicle spatial axes, again tolerances may introduce errors. Accordingly, the present invention contemplates a determination of a mounting error for the control unit 30 in functional block 112 after installation upon the vehicle 10.

In functional block 112, the control unit assembly 30 mounting error is determined as illustrated by the flow chart shown in FIG. 6. The flow chart in FIG. 6 is entered through block 120 and proceeds to functional block 122 where the vehicle 10 is positioned upon a horizontal surface and a mounting error determination algorithm within the control unit 36 is actuated. The mounting error determination algorithm sets a sensor index n at unity in functional block 124 then proceeds to functional block 126 where the first accelerometer in the electronic control module 36 is activated. When the accelerometer is activated, the stored assembly error from block 96 in FIG. 5 is combined with the sensor output. The assembly error is either added to or subtracted from, or otherwise combined with, the sensor output, as determined during the measurement and calculation process. The sensor output is read in functional block 128. Because the vehicle 10 is positioned upon a horizontal surface and stationary, any sensor reading would be due to a misalignment of the sensor axis with the intended axis causing a net gravitational force reading.

The sensor output reading is used in functional block 130 to calculate a mounting error for the accelerometer. The calculation is illustrated in FIG. 7 where the spatial axes of the horizontal plane are shown by the three orthogonal axes labeled x, y and z where:

the x axis corresponds to roll or longitudinal acceleration;
the y axis corresponds to pitch or lateral acceleration; and
the z axis corresponds to yaw or the earth's gravitational force.

Figure 7:
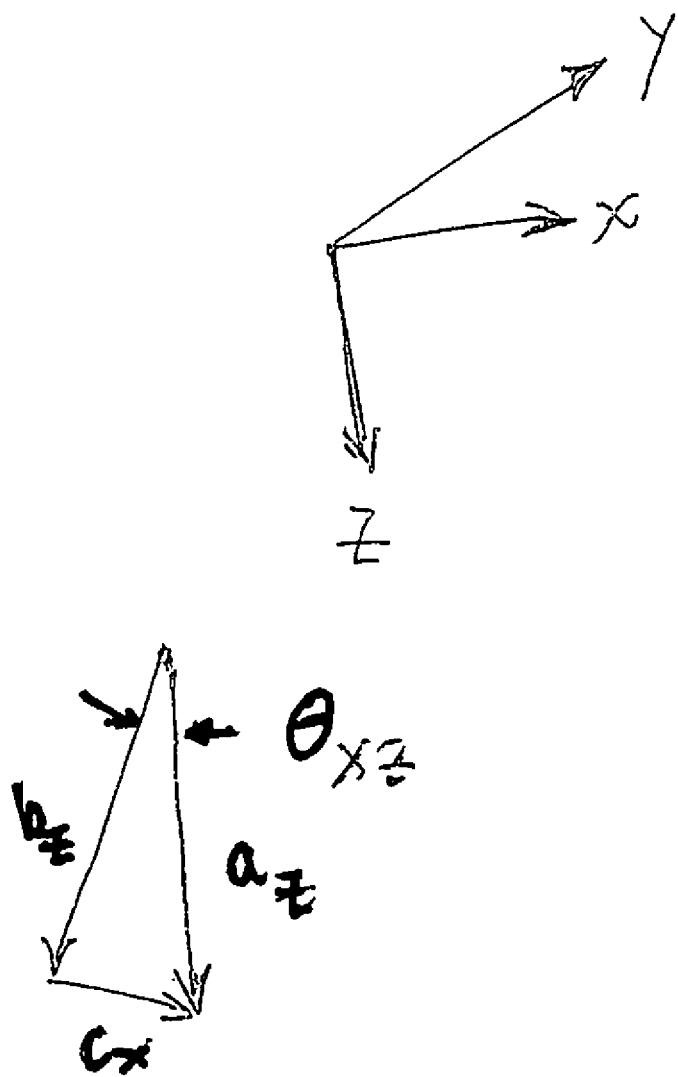
FIG. 7 illustrates the further calibration of a motion sensor after the control unit shown in FIG. 3 is mounted upon the vehicle shown in FIG. 1.

Also shown in FIG. 7 are the forces acting upon the sensor for measuring longitudinal acceleration along the x-axis, where:

$a_z$=the desired measured acceleration which is earth's gravity or 1 g;

$b_z$=the resultant measured by the sensor due to mounting error upon the vehicle, as would be determined by an accelerometer intended to measure acceleration along the z-axes; and $c_x$=the resultant of $a_z$ and $b_z$ that is caused by acceleration along the z-axis, or gravity, that is due to mounting error, as determined with an accelerometer intended to measure x-axis acceleration.

Using the above defined quantities, it is known from trigonometry that:

$$b_z = a_z \cos \theta_{xz} + a_x \sin \theta_{xz} + a_y \sin \theta_{yz}.$$

If it is assumed that the sensor is perfectly mounted with respect to the y axis, $\theta_{yz}$ is zero and the above formula becomes:

ti $b_z = a_z \cos \theta_{xz} + a_x \sin \theta_{xz}$, as illustrated in FIG. 7. If it is also assumed that the mounting errors are small, as they would be since they are due to tolerance errors, and on the order of seven or eight degrees or less, then the cos of such a small angle is approximately unity. Applying this second assumption simplifies the above formula to:

$$b_Z = a_z + a_x \sin \theta_{xz}.$$

The above formula shows that an acceleration, or an angular rate, in a purely x-axis orientation will cause an output on an mis-mounted sensor intended to measure a z axis acceleration, or angular rate sensor, such as the yaw sensor in the VCS system. Similar errors would exist if the mounting error were along the lateral, or y, axis.

As an example of the calculation, assume that a mounting error exists in an axis that causes pitch to couple to yaw, that is, the sensor is intended to mounted aligned with a purely $\theta_z$ axis but is actually mis-mounted with $\theta_{yz}$. Upon a sudden brake application, which would cause the vehicle to pitch forward, the mounting error would cause the a rate sensor to have an output. If the pitch were about 50°/sec., then the measured yaw rate would be 50 sin $\theta_{yz}$. If $\theta_{yz}$ were eight degrees, then the yaw signal would be approximately 7°/sec. Because actuation thresholds for the VSC system are typically in the range of 3 to 7°/sec, this signal might cause the VSC algorithm to correct for a potential spin out of the vehicle when there is actually no need to do so. However, by calculating and storing a mounting error as described above, the mounting error may be combined with the sensor output to cancel the miss-mounting error, thereby avoiding false triggering of the VSC system. The combined signal also may be supplied to other vehicular systems as needed. Alternately, the mounting error may be used to establish a threshold that would be utilized internally to avoid a false activation of the VSC system. The invention contemplates that such internal threshold may be used in combination with other sensor outputs to avoid false activation or response of the system. For example, as described above, a longitudinal deceleration due to a sudden stop in combination with the mounting error threshold may be utilized to prevent a false activation of the VSC system. Additionally, the invention also contemplates using the corrected sensor output data with other available vehicle dynamic parameters, such as, for example, wheel speeds and/or brake pressure to further refine the calculation of longitudinal acceleration and deceleration, and steering angle signals to refine the calculation of lateral acceleration.

After calculating the calibration in functional block 130, the mounting error is stored in the NVRAM in functional block 132 after which the index n is increased by one in functional block 134. The method then continues to decision block 136. In decision block 136, the current index n is compared to the maximum number of sensors to be tested, $n_{MAX}$. If the n is less than or equal to $n_{MAX}$, there are more sensors in the electronic control unit 36 to be calibrated and the method returns to block 126 to begin the calibration of the next sensor. However, if, in decision block 136, n is greater than $n_{MAX}$, all of the sensors are calibrated and the method returns through block 138 to FIG. 4 and exits through block 140. For a VSC system that has a lateral accelerometer and a longitudinal accelerometer, $n_{MAX}$ would be two.

During operation of the VSC system, the stored control unit assembly errors and the mounting errors are combined with the output of the corresponding sensor to provide a true sensor reading. Alternately, each of the errors can be accumulated as the value is determined to provide a net error factor. With this alternate approach, once the mounting error is determined, the mounting error is combined with the control unit assembly error value stored in the NVRAM and the combined net error factor written over the value stored in the NVRAM for the particular sensor. Thus, the alternate use of the corrections reduces the calculation required to utilize the calibrations. Also, as described above, the net error may be utilized to determine whether the yaw sensor is providing an erroneous reading that is caused by cross-axis mounting error.

Figure 8:
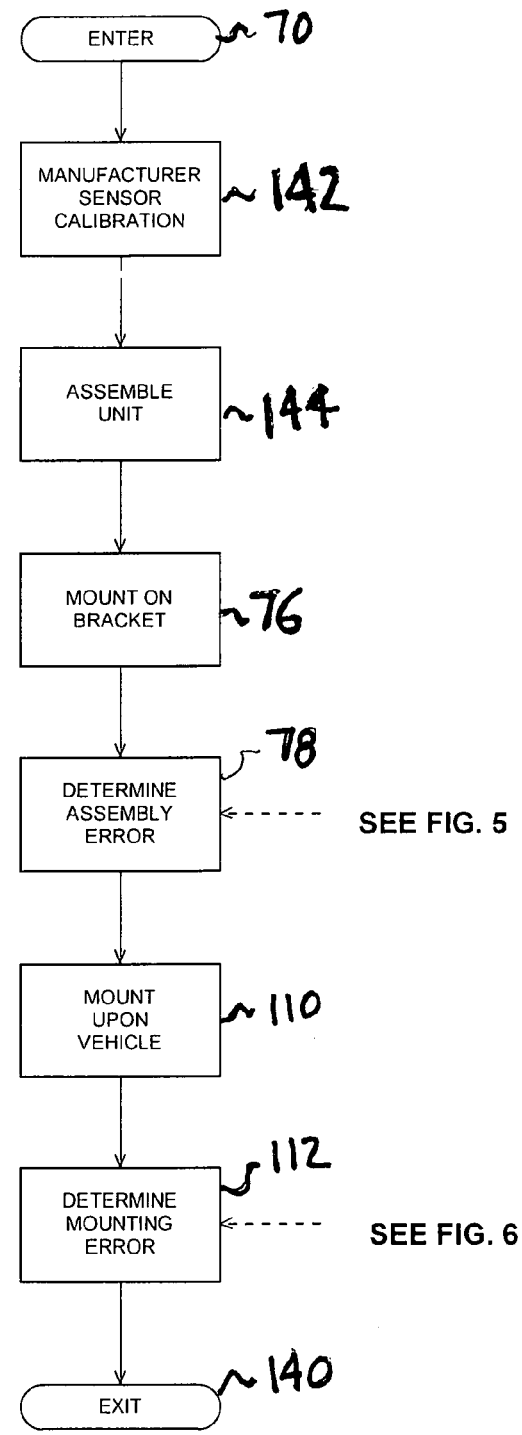
FIG. 8 is an alternate embodiment of the flow chart shown in FIG. 4.

An alternate embodiment of the invention is illustrated by the flow chart shown in FIG. 8. The method is entered through the block labeled 70 and proceeds to functional block 142 where the sensor offset errors are determined by the sensor manufacturer. Typically, after fabricating the sensor, the manufacturer actuates the sensor while it is aligned with respect to its primary axis and then records the output reading. For example, a longitudinal accelerometer would be placed in a horizontal plane and then actuated while held stationary. Ideally, the sensor should generate a zero output reading. Therefore, any resulting reading would be the sensor offset error and would have to be subtracted from, or otherwise combined with, sensor readings while the sensor is in use to produce a true reading. The sensor offset error may then be printed upon the sensor or, if the sensor includes a signal conditioning circuit, the offset error may be stored within the signal conditioning circuit. Such sensor offset errors are typically temperature sensitive. Accordingly, the offset error measurement is usually done at a temperature representing the average operating temperature the sensor is expected to experience. Alternately, the offset error may be measured over a range of typical expected operating temperatures and a lookup table provided. The alternate approach would be utilized if the control unit includes a temperature monitoring capability that would allow selection of the appropriate offset error from the lookup table valves. After determining the offset error, the sensors are shipped to the control unit manufacturer and the method continues as described above to functional block 144 where the control unit is assembled as described above for functional block 74 in FIG. 4. However, functional block 144 also includes an additional step of transferring the sensor offset errors and, if available the operating temperature lookup data to the controller non-volatile memory. The method than continues as described above for FIG. 4.

During operation of the VSC system with the alternate embodiment, the stored offset errors, the control unit assembly errors corrections and the mounting errors are combined with the output of the corresponding sensor to provide a true sensor reading. Alternately, each of the errors can be accumulated as the value is determined to provide a net error factor. With this alternate approach, the control unit assembly error is combined with the stored offset error and then written over the offset error in the NVRAM. Then, once the mounting error is determined, the mounting error is combined with the value stored in the NVRAM and the combined net error factor written over the value stored in the NVRAM for the particular sensor. Thus, the alternate use of the corrections reduces the calculation required to utilize the calibrations. Also, as described above, the net error may be utilized to determine whether the yaw sensor is providing an erroneous reading that is caused by cross-axis mounting error.

To summarize, allowable offset errors due to the accelerometer's and control unit manufacturing are measured and stored in a non-volatile memory location before being stored in a vehicle. When the sensor is mounted in the vehicle, these offsets are communicated to a microprocessor, which contains algorithms for performing VSC. The microprocessor then measures additional offset errors after installation of the sensors and control unit on the vehicle, and subtracts them from, or combines them with, the errors stored in memory from the manufacturing of the sensors and assembly of the unit. With this information, the errors due to installation for the sensors on a vehicle can be compensated by the microprocessor during operation of the VSC system.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment has been illustrated and described for a VSC system, the method also may utilized in other vehicle inertial based control systems, such as, for example, roll stability control systems or adaptive cruise control. Furthermore, the VSC system also may be programmed to function as an Anti-lock Brake System (ABS) and/or a Traction Control (TC) System. Additionally, while the preferred embodiment has been illustrated and described for a VSC system having a yaw sensor and lateral and longitudinal accelerometers, it will be appreciated that the invention also may be practiced with a VSC system having only a yaw sensor, and a lateral accelerometer.

What is claimed is:

1. A method for mitigating cross-axis mounting error for an inertial sensor comprising the steps of:
   (a) mounting an inertial sensor within an electronic control unit for an electronic stability control system that is attached to a hydraulic control valve, the electronic control unit including a non-volatile memory, with the combination of the electronic control unit and hydraulic control valve attached to a mounting bracket to form a controller assembly;
   (b) mounting the controller assembly upon a rotatable test stand;
   (c) rotating the test stand and controller assembly into a position;
   (d) determining a combined assembly mounting offset error due to combined errors from mounting of the sensor within the electronic control unit and mounting of the combination of the electronic control unit and the hydraulic control valve upon the bracket;
   (e) storing the combined assembly mounting offset error within the electronic control unit non-volatile memory;
   (f) installing the controller assembly upon a vehicle;
   (g) positioning the vehicle on a horizontal surface;
   (h) measuring an installation offset error while the vehicle is stationary;
   (i) determining a corrected installation offset error by combining the combined assembly mounting offset error measured in step (d) with the installation offset error measured in step (h); and
   (j) storing the corrected installation offset error in the electronic control unit non-volatile memory.

2. The method according to claim 1 wherein the test stand and controller assembly are rotated into a first position in step (c) and further wherein determination of the combined assembly mounting offset error in step (d) includes the following substeps:
   (d1) taking a first sensor reading;
   (d2) rotating the test stand and controller assembly into a second position;
   (d3) taking a second sensor reading; and
   (d4) combining the first and second sensor readings to determine an assembly offset error.

3. The method according to claim 2 wherein the inertial sensor is intended to sense motion relative one of three orthogonal axes with the remaining two orthogonal axes being non-sensing orthogonal axes for the sensor and with the first position of the test stand and controller assembly in step (c) aligned with a selected one of the non-sensing orthogonal axes and with the combined assembly offset error determined in step (d4) corresponding to the selected orthogonal axis and further wherein steps (c) through (e) are repeated for the remaining non-sensing orthogonal axis with the resulting combined assembly offset errors being combined in step (i) with the corresponding installation offset errors measured in step (h).

4. The method according to claim 2 wherein the test stand and controller assembly is rotated about at least one axis.

5. The method according to claim 3 wherein the sensor includes a sensor non-volatile memory and, prior to step (a), the inertial sensor is placed upon a true surface and sensor offset errors are measured for the inertial sensor relative to the true surface with the sensor offset errors being stored in the sensor non-volatile memory, the sensor offset errors being combined with the combined assembly mounting offset errors determined in step (d) and the combined assembly mounting offset errors being stored in the electronic control unit non-volatile memory in step (e).

6. The method according to claim 5 wherein the test stand and controller assembly is rotated through 180 degrees in step (d2).

7. The method according to claim 4 wherein the test stand and controller assembly is sequentially rotated about a plurality of orthogonal axes.

8. The method according to claim 6 wherein the electronic control unit is a Vehicle Stability Control system Electronic Control Unit.

9. The method according to claim 8 wherein the inertial sensor is mounted within the Vehicle Stability Control system Electronic Control Unit.

10. The method according to claim 9 wherein the inertial sensor is mounted directly upon a printed circuit board that is disposed within the Vehicle Stability Control system Electronic Control Unit.

11. The method according to claim 10 wherein a plurality of inertial sensors are mounted in the Vehicle Stability Control system Electronic Control Unit and the method is applied to determine corrected offset errors for each of the sensors.

12. The method according to claim 11 wherein the plurality of inertial sensors includes at least one accelerometer.

13. The method according to claim 12 wherein the combined offset error for at least one of the inertial sensors is utilized to determine a threshold value for disabling the Vehicle Stability Control system.

14. The method according to claim 12 wherein the electronic control unit is electrically connected to at least one other vehicle control system and further wherein the corrected installation offset errors are transmitted to the other vehicle control system for use therein.

15. The method according to claim 11 wherein the plurality of inertial sensors includes at least one yaw sensor.

16. The method according to claim 6 wherein the electronic control unit non-volatile memory stores an algorithm for carrying out the determination of the corrected installation offset errors in step (i).

* * * * *